United States Patent
Ferrozzi et al.

(10) Patent No.: US 11,361,272 B2
(45) Date of Patent: Jun. 14, 2022

(54) DEVICE AND METHOD FOR MONITORING A MOBILE OBJECT

(71) Applicant: Robert Bosch GmbH, Stuttgart (DE)

(72) Inventors: Roberto Ferrozzi, Reutlingen (DE); Ando Feyh, Dettenhausen (DE); Fernando Suarez Lainez, Reutlingen (DE); Hannes Wolf, Dusslingen (DE); Hannes Rose, Shanghai (CN); Henar Martin Rodriguez, Stuttgart (DE); Julian Bartholomeyczik, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 16/304,880

(22) PCT Filed: May 16, 2017

(86) PCT No.: PCT/EP2017/061671
§ 371 (c)(1),
(2) Date: Nov. 27, 2018

(87) PCT Pub. No.: WO2017/207260
PCT Pub. Date: Dec. 7, 2017

(65) Prior Publication Data
US 2020/0327487 A1    Oct. 15, 2020

(30) Foreign Application Priority Data

May 31, 2016 (DE) .......................... 102016209402.5

(51) Int. Cl.
*G06Q 10/08* (2012.01)
*G07B 17/00* (2006.01)

(52) U.S. Cl.
CPC ..... *G06Q 10/0832* (2013.01); *G06Q 10/0833* (2013.01); *G07B 2017/0004* (2013.01)

(58) Field of Classification Search
CPC .......... G06Q 10/0832; G06Q 10/0833; G07B 2017/0004
(Continued)

(56) References Cited

U.S. PATENT DOCUMENTS 10,430,750 B2 * 10/2019 Kriss .................. G06Q 10/0833
2004/0186691 A1 * 9/2004 LeBlanc ................ G01D 9/005
702/187
(Continued)

FOREIGN PATENT DOCUMENTS

CN        204988544 U      1/2016
DE    102007018633 A1    10/2008
(Continued)

OTHER PUBLICATIONS

Heyn, Suzanne; "Shipment Monitoring Technology: Picking Up the Signals"; Apr. 14, 2014. (Year: 2014).*
(Continued)

*Primary Examiner* — Resha Desai
*Assistant Examiner* — Dione N. Simpson
(74) *Attorney, Agent, or Firm* — Norton Rose Fulbright US LLP; Gerard Messina

(57) ABSTRACT

A device for monitoring a mobile object having a sensor unit, which has at least one sensor for monitoring the mobile object. The device additionally has a processing unit, which is designed to record measured values from a sensor unit within a time span. The processing unit is designed to determine, as a function of the recorded measured values, in what kind of process in a transport chain the object is involved. A method for monitoring a mobile object is also described.

6 Claims, 3 Drawing Sheets

(58) Field of Classification Search
USPC .......................................................... 705/332
See application file for complete search history.

(56) References Cited

U.S. PATENT DOCUMENTS

| | | | | |
|---|---|---|---|---|
| 2010/0267375 | A1* | 10/2010 | Lemmon | G06F 21/74 |
| | | | | 455/418 |
| 2011/0077909 | A1* | 3/2011 | Gregory | G01N 21/00 |
| | | | | 702/187 |
| 2014/0372335 | A1* | 12/2014 | Jones | G06Q 10/0833 |
| | | | | 705/333 |
| 2015/0179041 | A1* | 6/2015 | Blaufuss | G07C 9/38 |
| | | | | 340/686.6 |

FOREIGN PATENT DOCUMENTS

| | | | |
|---|---|---|---|
| DE | 102010029671 A1 | 12/2011 | |
| EP | 2375573 A2 | 10/2011 | |
| WO | WO-2017064790 A1 * | 4/2017 | ............ G01S 19/49 |

OTHER PUBLICATIONS

International Search Report for PCT/EP2017/061671, dated Jul. 24, 2017.

* cited by examiner

DEVICE AND METHOD FOR MONITORING A MOBILE OBJECT

BACKGROUND INFORMATION

The present invention relates to a device for monitoring a mobile object having a sensor unit, which has at least one sensor for monitoring the mobile object. The device additionally has a processing unit, which is designed to record measured values from a sensor unit within a time span.

Such a device is disclosed for example in the utility model document CN 204988544 U.

The present invention also relates to a method for monitoring a mobile object.

A transport chain is a sequence of technologically and organizationally connected processes in which persons or goods are moved from an origin to a destination. When transporting goods, these processes may be for example a transport by airplane, train, truck or ship or a warehousing and handling of the goods to be transported.

SUMMARY

The present invention relates to a device for monitoring a mobile object having a sensor unit, which has at least one sensor for monitoring the mobile object. The device additionally has a processing unit, which is designed to record measured values from the sensor unit within a time span.

In accordance with the present invention, the processing unit is designed to determine, as a function of the recorded measured values, in what kind of process in a transport chain the object is involved. It is advantageous in this regard that no additional GPS signal or no additional information is required from outside, for example from the provider or via an active gateway, in order to determine the process in which the mobile object is involved. Rather, it is possible to determine the process by using the measured values of the at least one sensor of the sensor unit that exists in any case for monitoring the mobile object. Thus no additional components are required to determine the process in the transport chain, which makes it possible to keep the manufacturing costs of the device low.

One advantageous development of the present invention provides for the processing unit to be designed to compare the recorded measured values to at least one measured value profile stored in a memory unit, which represents a predetermined process in the transport chain, and to determine this predetermined process as the process if there is at least a partial match between the recorded measured values and the stored measured value profile.

It is advantageous in this regard that this offers a simple possibility for determining in what kind of process in the transport chain the mobile object is involved. Moreover, it is also possible to store different measured value characteristic curves in order thus to check different predetermined processes.

Another advantageous development of the present invention provides for the device to be designed for stationary attachment on the mobile object and for the first sensor to be designed as a triaxial acceleration sensor for recording the measured values, which represent a movement profile, and for the processing unit to be designed to determine the process as a function of the movement profile.

It is advantageous in this regard that on the basis of the movement profile it is possible to determine very exactly in what kind of process in the transport chain the mobile object is involved, in particular since different processes respectively have very characteristic movement profiles.

One advantageous development of the present invention provides for the sensor unit to have a temperature sensor or a moisture sensor or a pressure sensor or a light sensor or a rate-of-rotation sensor for recording the measured values, the processing unit being designed to determine the process as a function of the measured values of the temperature sensor or of the moisture sensor or of the pressure sensor or of the light sensor or of the rate-of-rotation sensor.

It is advantageous in this connection that different processes may be checked by different sensors. For example, using the pressure sensor it is possible to determine at what altitude the mobile object is located in order to infer from this for example that the object is being transported in an airplane.

Another advantageous development of the present invention provides for the processing unit to be designed to carry out at least one response as a function of the process.

It is advantageous in this connection that this offers a possibility to respond to the process in which the mobile object is involved. This makes it possible to conserve resources, for example.

One advantageous specific embodiment of the present invention provides for the device to have a communication unit and for the processing unit to be designed as a response to control the activity of the communication unit, in particular to switch the communication unit on or off or to switch it to a listening state. It is advantageous in this regard that the activity of the communication unit may be controlled in such a way that the communication unit is switched off or in the listening state when it is not needed or when it is not permitted to transmit actively. This makes it possible to reduce the energy consumption of the device.

Another advantageous specific embodiment of the present invention provides for the communication unit to be designed to communicate wirelessly, in particular by a wireless method for devices, such as Bluetooth® and/or a wireless network, such as Wi-Fi®.

It is advantageous in this regard that it is possible to perform an uncomplicated secure read-out of the measured values.

Another advantageous specific embodiment of the present invention provides for the processing unit to be designed, as a response, to increase or lower a measuring frequency at which the measured values are recorded.

It is advantageous in this regard that the measuring frequency may be adapted to the process in the transport chain. Thus it is possible, for example during a longer transport by ship, in which there is normally only a slight change of the environmental influences on the mobile object, to measure less frequently in order to conserve energy. By contrast, in an eventful truck transport, it is possible to measure more frequently so as better to document possible damage to the object and thus to provide for improved monitoring of the mobile object.

The present invention also relates to a method for monitoring a mobile object comprising the method steps:

a. recording measured values of at least one sensor of a sensor unit within a time span,
b. determining in what kind of a process in a transport chain the mobile object is involved as a function of the recorded measured values.

It is advantageous in this regard that no additional GPS signal and also no additional information from outside, for example from the provider or via an active gateway, are required, in order to determine the process in which the mobile object is involved. Rather, it is possible to determine the process by using the measured values of the at least one sensor of the sensor unit that exists in any case for monitoring the mobile object. Thus it is possible to determine during the entire transport chain in what kind of process the mobile object is involved without information having to be actively entered from outside.

One advantageous development of the present invention provides for the recorded measured values to be compared, in method step b, to at least one measured value profile stored in a memory unit, which represents a predetermined process, and to determine this predetermined process as the process if there is at least a partial match between the recorded measured values and the stored measured value profile.

It is advantageous in this regard that this offers a simple possibility for determining the process in the transport chain in which the mobile object is involved. Additionally, it is also possible to store different measured value characteristic curves in order thus to be able to detect more than one predetermined process.

One advantageous development of the method of the present invention provides for method step b to be followed by a method step c, in which at least one response is carried out as a function of the determined process.

It is advantageous in this regard that this offers a possibility to respond to the determined process in which the mobile object is involved. This makes it possible to conserve resources, for example.

Another advantageous development of the method of the present invention provides for the activity of a communication unit to be controlled as a response in method step c, in particular for the communication unit to be switched on or off or to be switched to a listening state.

It is advantageous in this regard that the activity of the communication unit may be controlled in such a way that the communication unit is switched off or in the listening state when it is not needed or when it is not permitted to transmit actively. This makes it possible for the communication unit to reduce the energy consumption.

Another advantageous development of the method of the present invention provides for increasing or reducing a measuring frequency at which the measured values are recorded as a response in method step c.

It is advantageous in this regard that the measuring frequency may be adapted to the specific process. Thus it is possible, for example during a longer transport by ship, in which there is normally only a slight change of the environmental influences on the object, to measure less frequently in order to conserve energy. By contrast, in an eventful truck transport, it is possible to measure more frequently so as better to document possible damage to the object and thus to provide for improved monitoring of the mobile object.

DETAILED DESCRIPTION OF EXAMPLE EMBODIMENTS

Figure 1:
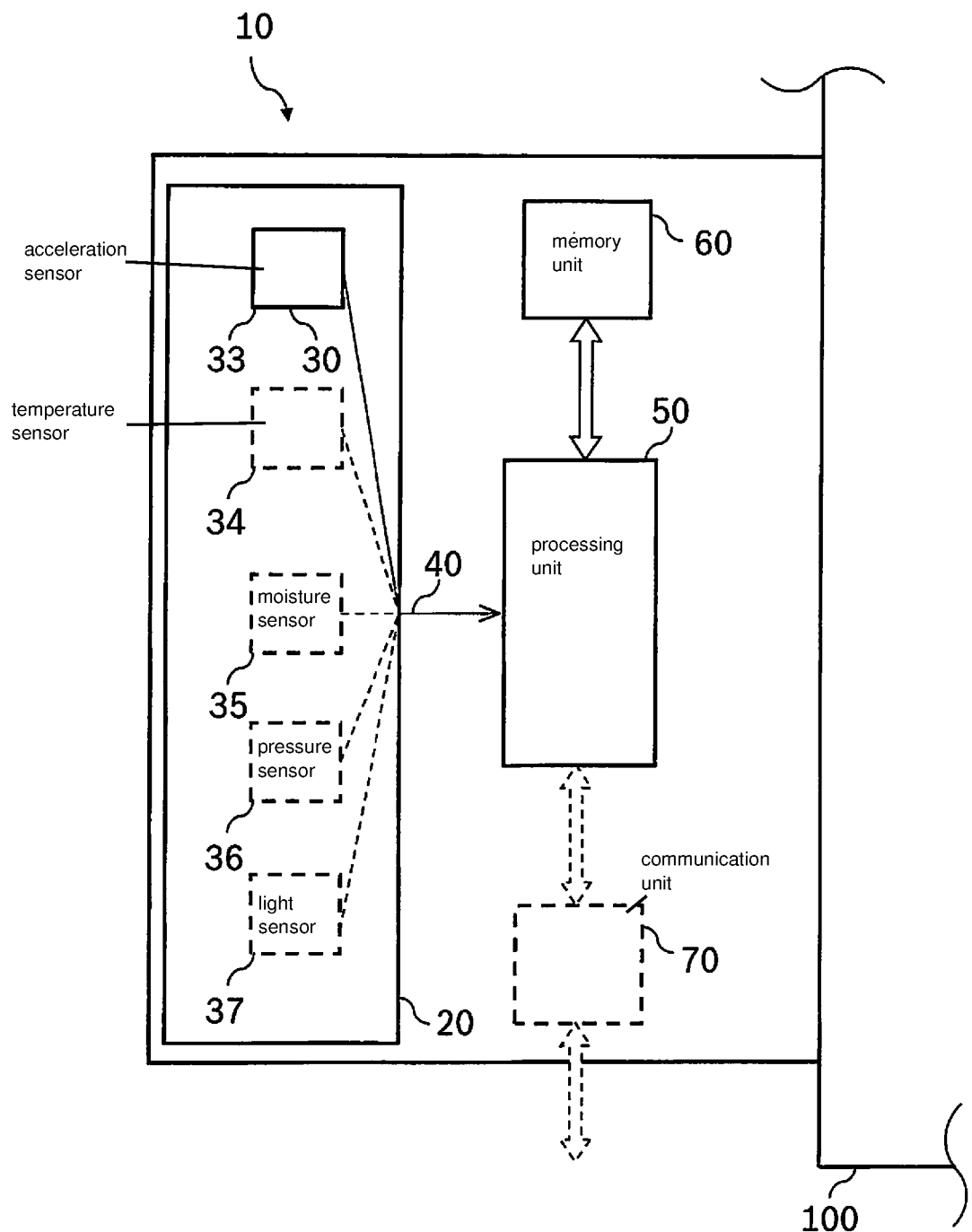
FIG. 1 shows an exemplary embodiment of a device according to the present invention.

FIG. 1 shows an exemplary embodiment of a device according to the present invention. A device 10 having a sensor unit 20 is shown. Sensor unit 20 has at least one sensor 30, which is here designed as a, preferably triaxial, acceleration sensor 33 and is used to monitor a mobile object 100. Sensor unit 20 optionally or alternatively has a temperature sensor 34, a moisture sensor 35, a pressure sensor 36, a light sensor 37 or a rate-of-rotation sensor (not shown). Monitoring is to be understood in such a way that mobile object 100 is monitored as to whether external influences act on the object that could result in damage to mobile object 100. Such external influences may be for example excessive vibrations or shocks, temperatures that are too high or too low, excessive moisture or excessive incident light. Device 10 furthermore has a processing unit 50 and optionally a memory unit 60. Sensor unit 20 is here connected to processing unit 50 in such a way that measured values 40 are able to be transmitted by sensors 33, 34, 35, 36 or 37 of sensor unit 20 to processing unit 50 and may be recorded by processing unit 50. Processing unit 50 is additionally connected to memory unit 60 in order to allow for a bidirectional data exchange. Processing unit 50 is thus able to store recorded measured values 40 in memory unit 60 and to read these out again. It is also possible to store at least one measured value profile in memory unit 60, which represents a predetermined process in the transport chain. Processing unit 50 is thus also able to read out this measured value profile. Furthermore, device 10 optionally has a communication unit 70. Communication unit 70 is likewise connected bidirectionally to processing unit 50 and is additionally designed to establish a preferably wireless connection to an external system (not shown), for example a wireless method for devices, such as Bluetooth® connection and/or a wireless network, such as a Wi-Fi®.connection. Device 10 is attached in a stationary manner on mobile object 100. This is in particular necessary if the at least one sensor 30 is designed, as in this exemplary embodiment, as acceleration sensor 33 so that the external influences acting on mobile object 100 may be transmitted accordingly to device 10 and may thus be registered by acceleration sensor 33. If by contrast temperature sensor 34 for example is used to monitor the state of mobile object 100, then device 10 could also be simply laid into mobile object 100.

In an alternative exemplary embodiment (not shown), sensor unit 20 may have previously mentioned sensors 33, 34, 35, 36, 37 also individually or in any other combination. Furthermore, sensors having sensor principles other than the ones previously mentioned are also possible as long as the sensors are suitable for monitoring mobile object 100 and are additionally able to infer from the provided measured values 40 in what type of process in the transport chain mobile object 100 is involved.

Figure 2:
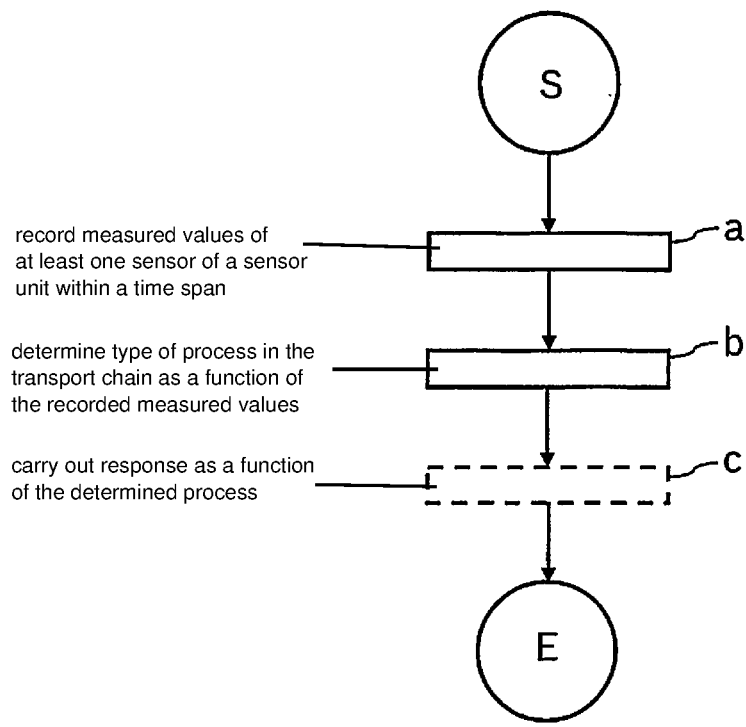
FIG. 2 shows an exemplary embodiment of a method according to the present invention.

FIG. 2 shows an exemplary embodiment of the method according to the present invention.

First, in a method step a, measured values 40 of at least one sensor 30 of a sensor unit 20 are recorded within a time span by a processing unit 50. The length of the time span may be chosen variously, depending on how long a recording of measured values 40 is required in order to be able to draw a meaningful inference regarding the type of process in a transport chain in which a mobile object 100 is involved. The time span may range from a few milliseconds to several minutes, hours or even days. Optionally, in method step a, the recorded measured values 40 may be stored by processing unit 50 in a memory unit 60. Subsequently, in a method step b, a determination is made as a function of the recorded measured values 40 as to the type of process in the transport chain in which object 100 is involved. The process is determined for example in that the recorded measured values 40 are compared to at least one measured value profile stored in memory unit 60, which represents a predetermined process. A predetermined process may be understood for example as a transport of mobile object 100 by airplane, train, truck or ship or as a warehousing of mobile object 100. These different predetermined processes each have typical measured value characteristics. By comparing the recorded measured values 40 to the stored measured value profile, a check is performed to determine whether the recorded measured values 40 and the measured value profile match at least partially and whether thus the predetermined process may be inferred as the actual process. A certain deviation of the recorded measured values 40 and the stored measured value profile may be understood as a partial match, for example at a tolerance of 5 or 10 percent. If the recorded measured values 40 only match with a segment of the stored measured value profile, this may also be understood as a partial match, since the time span, within which measured values 40 are recorded, typically is not identical with the time span of the measured value profile. Furthermore it is also possible that measured values 40 are compared to various measured value characteristics in order thus to determine the process in the transport chain. Alternatively, it is also possible to compare recorded measured values 40 to a threshold value that offers an indication of a predetermined process in the transport chain. Thus, if a certain pressure threshold value is undershot, it may be assumed that mobile object 100 is transported in an airplane.

Optionally, the determination of the process in method step b is followed by a method step c. In method step c, processing unit 50 carries out a response as a function of the determined process. Such a response may be for example that a measuring frequency, at which measured values 40 are recorded by processing unit 50, is lowered or increased. Here it is also possible that the measuring frequency is individually adapted for each sensor 33, 34, 35, 36, 37.

Alternatively, if an optional communication unit 70 exists, it is possible for example to switch this communication unit 70 on or off or to switch it into a listening state. In the listening state, communication unit 70 no longer transmits signals, but is only able to receive signals. These responses are adjusted to the determined process in the transport chain in order for example to permit no communication during transport by airplane or to lower the measuring frequency when transporting by ship.

As another alternative response, if it is detected that mobile object 100 is warehoused, it is possible that device 10 is switched into a sleep state and that it is woken up only by a wake-up signal, preferably triggered by a shock detected by acceleration sensor 33.

Figure 3:
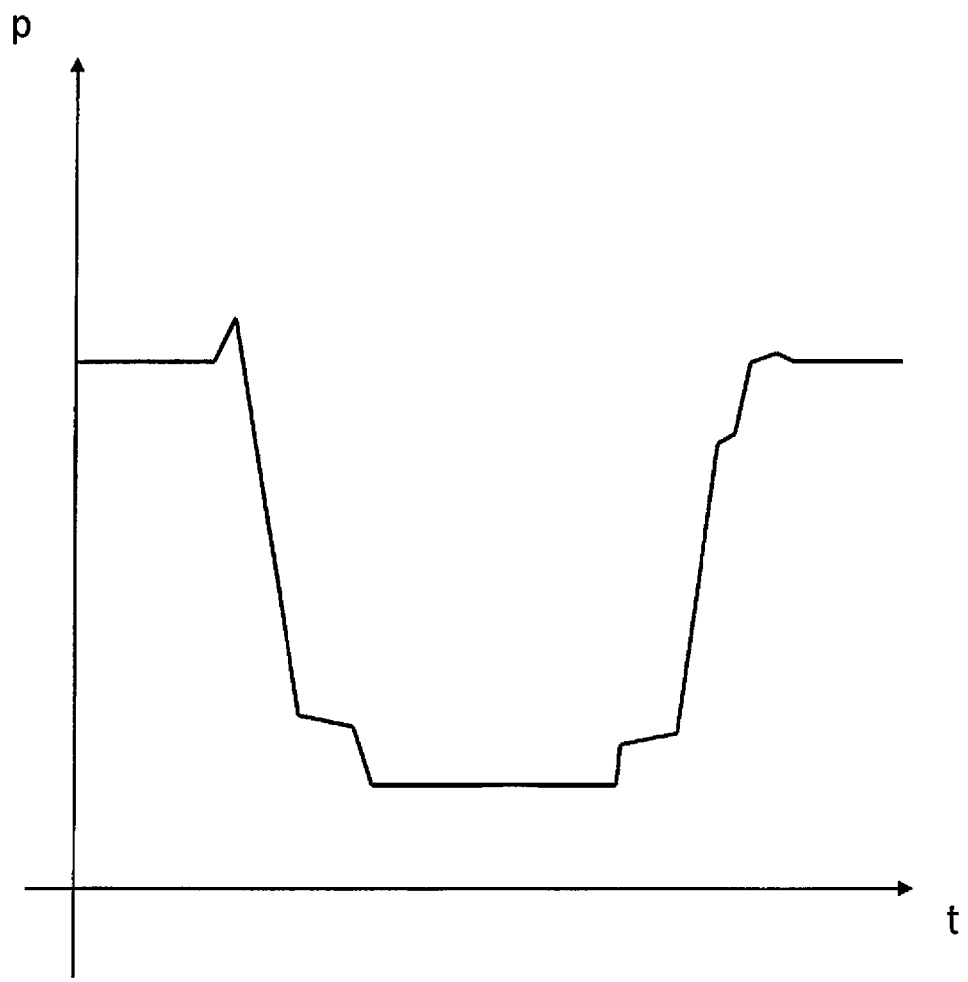
FIG. 3 shows an exemplary measured value profile over time for a predetermined process in a transport chain.

FIG. 3 shows an exemplary measured value profile over time for a predetermined process. The figure shows a typical profile of air pressure p in an airplane cabin over time t, beginning with take-off through the actual flight until the plane has landed. At the beginning, the air pressure is constant. As the airplane starts, the air pressure first experiences a small peak upward and subsequently falls with a small step to a markedly lower value. During the approach to landing, the air pressure subsequently rises again with a small step until reaching the air pressure as prior to take-off when landing.

What is claimed is:

1. A device for monitoring a mobile object, comprising:
   at least one sensor sensing and monitoring the mobile object; and
   a processor recording measured values from the sensor within a time span of a measuring frequency, wherein the processor determines, as a function of the recorded measured values, in what type of process in a transport chain the object is involved;
   wherein the mobile object is monitored, via the processor, as to whether external influences acting on the mobile object could damage the mobile object, wherein the external influences include at least two of: (i) excessive vibrations or shocks, (ii) temperatures below a minimum temperature or above a maximum temperature, (iii) excessive moisture; and/or (iv) excessive incident light, and
   wherein no GPS signal or no information is required from a provider or an active gateway to determine the type of process in which the mobile object is involved,
   wherein the device is attached on the mobile object, and the at least one sensor includes a triaxial acceleration sensor for recording the measured values of at least one measured value profile, which represent a movement profile, so that the external influences acting on the mobile object are transmittable to the device and registered by the acceleration sensor, and wherein the processor determines the process as a function of the movement profile, and
   wherein the processor is connected to the at least one sensor so that the measured values are transmittable by the at least one sensor to the processor and recorded by the processor,
   wherein the processor is additionally connected to a memory to allow for a bidirectional data exchange, so that the processor records and reads out the measured values in the memory, wherein the at least one measured value profile, which represents the predetermined process in the transport chain, is stored in the memory, so that the processor is able to read out the measured value profile,
   wherein a communication unit is connected bi-directionally to the processor and establishes a wireless connection to an external Bluetooth or Wi-Fi connection, and
   wherein the processor compares the recorded measured values to at least one measured value profile stored in the memory, which profile represents a predetermined process in the transport chain, and to determine that the predetermined process is the actual process if there is at least a partial match between the recorded measured values and the stored measured value profile,
   wherein the processor performs at least one response as a function of the determined process, and wherein the processor increases and/or lowers, as the at least one response, a measuring frequency at which the measured values are recorded,
   wherein the length of the time span of the measuring frequency is chosen depending on how long a recording of the measured values is required to draw a meaningful inference regarding the type of process in the transport chain in which the mobile object is involved, and
   wherein the at least one sensor includes a plurality of sensors, and wherein the measuring frequency is individually adapted for each of the sensors.

2. The device as recited in claim 1, wherein the at least one sensor further includes a temperature sensor and/or a moisture sensor and/or a pressure sensor and/or a light sensor and/or a rate-of-rotation sensor, and wherein the processor determines the process as a function of the measured values of the temperature sensor and/or the moisture sensor and/or the pressure sensor and/or the light sensor and/or the rate-of-rotation sensor.

3. The device as recited in claim 1, further comprising:
a communication unit, and the processor controls activity of the communication unit as the at least one response, the processor switching the communication unit on and/or off and/or to switch the communication unit into a listening state.

4. The device as recited in claim 3, wherein the communication unit communicates via the Bluetooth and/or the Wi-Fi connection.

5. A method for monitoring a mobile object, the method comprising:
recording, via a processor, measured values of at least one sensor within a time span of a measuring frequency; and
determining, via the processor, in what type of a process in a transport chain the mobile object is involved as a function of the recorded measured values;
wherein the mobile object is monitored, via the processor, as to whether external influences acting on the mobile object could damage the mobile object, wherein the external influences include at least two of: (i) excessive vibrations or shocks, (ii) temperatures below a minimum temperature or above a maximum temperature, (iii) excessive moisture; and/or (iv) excessive incident light, and
wherein no GPS signal or no information is required from a provider or an active gateway to determine the type of process in which the mobile object is involved,
wherein the device is attached on the mobile object, and the at least one sensor includes a triaxial acceleration sensor for recording the measured values of at least one measured value profile, which represent a movement profile, so that the external influences acting on the mobile object are transmittable to the device and registered by the acceleration sensor, and wherein the processor determines the process as a function of the movement profile, and
wherein the processor is connected to the at least one sensor so that the measured values are transmittable by the at least one sensor to the processor and recorded by the processor,
wherein the processor is additionally connected to the memory to allow for a bidirectional data exchange, so that the processor records and reads out the measured values in the memory, wherein the at least one measured value profile, which represents the predetermined process in the transport chain, is stored in the memory, so that the processor is able to read out the measured value profile, and
wherein a communication unit is connected bi-directionally to the processor and establishes a wireless connection to an external Bluetooth or Wi-Fi connection, and
wherein the processor compares the recorded measured values to at least one measured value profile stored in the memory, which profile represents a predetermined process in the transport chain, and to determine that the predetermined process is the actual process if there is at least a partial match between the recorded measured values and the stored measured value profile,
wherein the processor performs at least one response as a function of the determined process, and wherein the processor increases and/or lowers, as the at least one response, a measuring frequency at which the measured values are recorded,
wherein the length of the time span of the measuring frequency is chosen depending on how long a recording of the measured values is required to draw a meaningful inference regarding the type of process in the transport chain in which the mobile object is involved, and
wherein the at least one sensor includes a plurality of sensors, and wherein the measuring frequency is individually adapted for each of the sensors.

6. The method as recited in claim 5, wherein activity of a communication unit is controlled as the at least one response in the carrying out, the communication unit is switched on or off or is switched to a listening state.

* * * * *